United States Patent [19]

Wilson

[11] 4,109,691
[45] Aug. 29, 1978

[54] COMBINATION TORQUE RELEASE SCREW AND SCREW DRIVER

[76] Inventor: Floyd Leroy Wilson, 1015 Moro St., Manhattan, Kans. 66502

[21] Appl. No.: 862,740

[22] Filed: Dec. 21, 1977

[51] Int. Cl.² .............................................. B28D 15/00
[52] U.S. Cl. ..................... 145/50 D; 85/45
[58] Field of Search .................... 85/61, 62, 45; 145/50 D

[56] References Cited

U.S. PATENT DOCUMENTS

| | | | |
|---|---|---|---|
| 1,261,916 | 4/1918 | Forbes | 85/45 |
| 1,797,390 | 3/1931 | Wood | 85/45 UX |
| 3,134,291 | 5/1964 | Barry | 85/45 |
| 3,134,292 | 5/1964 | Walton | 85/45 |
| 3,190,169 | 6/1965 | Rosan | 85/45 |
| 3,253,625 | 5/1966 | Oestereicher | 85/45 X |
| 3,280,689 | 10/1966 | Rubin | 85/61 |
| 3,285,120 | 11/1966 | Kartiala | 85/62 |
| 3,302,672 | 2/1967 | Walton | 85/45 X |
| 3,460,428 | 8/1969 | Charles | 85/45 X |
| 3,498,174 | 3/1970 | Schuster et al. | 85/61 |
| 3,595,124 | 7/1971 | Lindstrand et al. | 85/61 |
| 3,695,321 | 10/1972 | Garehime | 85/45 |
| 3,763,725 | 10/1973 | Reiland | 85/61 |
| 3,788,186 | 1/1974 | Crites | 85/62 |
| 3,812,757 | 5/1974 | Reiland | 85/61 |
| 3,929,152 | 12/1975 | Graham | 85/45 X |
| 4,037,515 | 7/1977 | Kesselman | 85/61 |

FOREIGN PATENT DOCUMENTS

| | | | |
|---|---|---|---|
| 1,375,769 | 9/1964 | France | 85/45 |
| 2,353,751 | 5/1975 | Fed. Rep. of Germany | 85/61 |
| 1,144,080 | 3/1969 | United Kingdom | 85/61 |
| 1,223,900 | 3/1971 | United Kingdom | 85/45 |

*Primary Examiner*—Harold D. Whitehead

[57] ABSTRACT

A threaded fastener adapted to be threaded into a workpiece only to a predetermined torque is provided which includes a pair of frangible lugs mounted on the fastener head and engageable by a specialized driving tool. The tool is used to initially engage the lugs to partially spread the latter apart and frictionally couple the driver and fastener so as to facilitate insertion of the fastener; when the fastener is fully threaded into the workpiece, excess torque applied through the driver causes the lugs to cleanly break off from the head, thus presenting a tamper-proof connection. The lugs can be mounted directly on the fastener head or on an annular mounting element frangibly secured to the head itself. The tool includes a head of generally circular cross section having a pair of radially outwardly extending cam projections which engage the fastener lugs during driving operations. In preferred forms, the tool also includes respective, planar lug-engaging faces which ensure that the fastener lugs are cleanly separated from the fastener at the completion of the driving operation.

2 Claims, 11 Drawing Figures

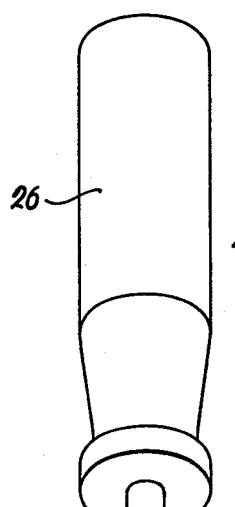
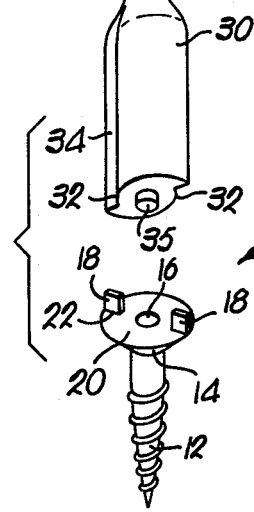
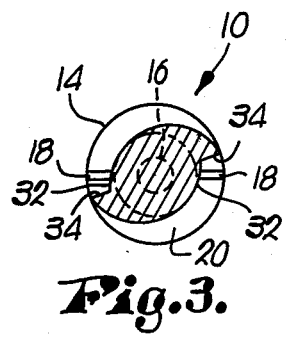
Fig.3.
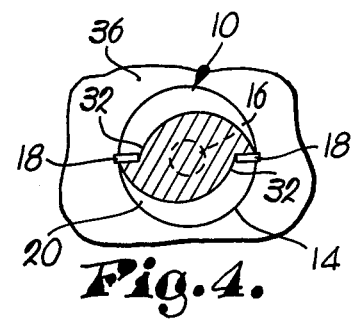
Fig.4.
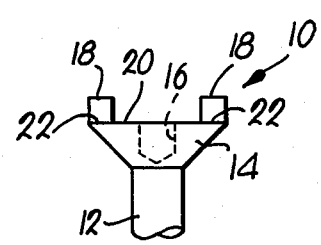
Fig.2.
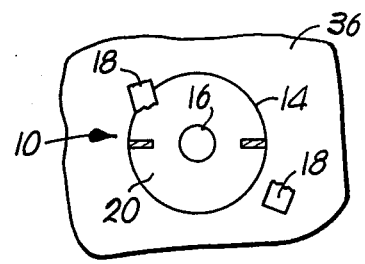
Fig.5.
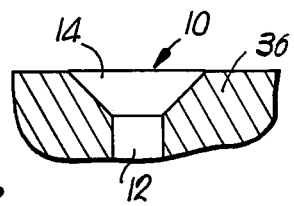
Fig.6.
Fig.1.
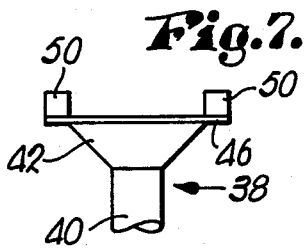
Fig.7.
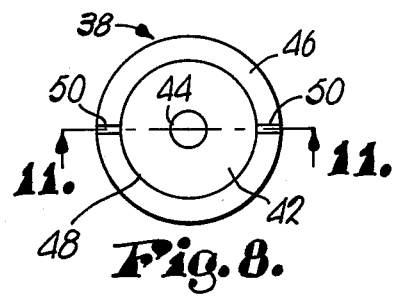
Fig.8.
Fig.9.
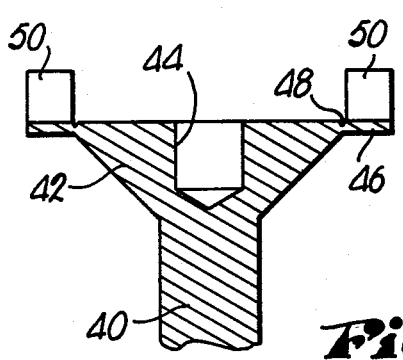
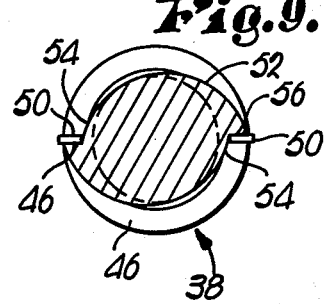
Fig.11.
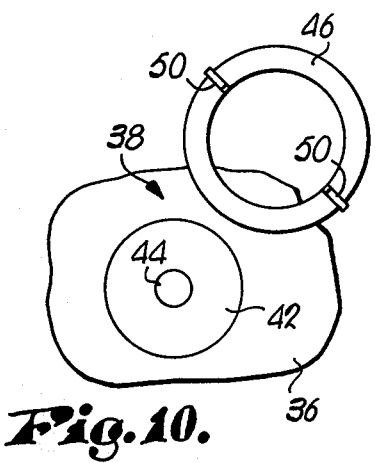
Fig.10.

COMBINATION TORQUE RELEASE SCREW AND SCREW DRIVER

This invention relates to a specialized screwtype fastener which is adapted to be threaded into a workpiece to a desired, predetermined torque level, and to a specialized driving tool to be used in conjunction with the fastener. More particularly, it is concerned with such a fastener and driver combination wherein the fastener is provided with a pair of spaced, frangibly secured lugs which are adapted to break from the fastener head when excess torque is applied; the tool on the other hand includes a head of generally circular cross section having outermost cam-like projections which engage the fastener lugs and serve to cleanly break the latter off from the head when the fastener is fully embedded into a workpiece.

Various types of torque release screws have been proposed in the past. In general, these types of fasteners are designed to be installed into a workpiece or the like, but are provided with structure for ensuring that the fastener can only be tightened to a desired, predetermined torque. Exemplary torque release fasteners are illustrated in U.S. Pat. Nos. 1,506,500, 2,830,635, 3,673,912 and 3,854,372.

It is the most important object of the present invention to provide an improved, simplified screw fastener which is adapted to be threaded into a workpiece or the like only up to a predetermined torque, and which is incapable of further tightening after the desired torque limit has been reached.

As a corollary to the foregoing, another object of the invention is to provide a screw fastener which includes an elongated, threaded shank having a head and at least a pair of spaced lugs frangibly coupled to the head; the lugs have a break-off resistance correlated with the predetermined torque value of the fastener, in order that the lugs can break free of the fastener head when a torque is applied which is greater than the predetermined desired torque.

Another object of the invention is to provide a screw fastener of the type described wherein the break-off lugs are in spaced relationship in order to receive a driving tool therebetween such that the tool can engage the lugs and initially spread the latter apart to a limited degree so as to establish a frictional engagement between the tool and fastener lugs; in this manner the fastener can be screwed into the workpiece, and, when the fastener is fully embedded, torque applied through the tool serves to cleanly break the lugs free from the fastener.

A still further object of the invention is to provide a specialized driving tool for use with the threaded fasteners hereof which includes a handle, a shank secured to the handle, and a driving head secured to the shank, with the head being of generally circular cross section and including a pair of spaced, radially extending cam projections adapted to engage corresponding lugs on the threaded fastener. The tool also includes a generally planar, radially outwardly extending face adjacent the outermost end of each cam projection in order to provide direct, face-to-face engagement between the respective faces and the corresponding fastener lugs.

IN THE DRAWING:

FIG. 1 is a perspective-type view of a torque release screw fastener in accordance with the invention, along with a specialized driving tool to be used in conjunction therewith;

FIG. 2 is a fragmentary elevational view of one form of the fastener of the present invention;

FIG. 3 is a cross sectional view illustrating the orientation of the tool driving head disposed between and in frictional engagement with the lugs of the screw fastener;

FIG. 4 is a sectional view similar to that of FIG. 3, showing the fastener embedded into a workpiece and with the planar, lug-engaging faces of the driving tool being in engagement with the respective fastener lugs prior to complete break-off of the latter;

FIG. 5 is a view similar to FIG. 1 and showing the fastener lugs being broken off from the fastener head;

FIG. 6 is a fragmentary sectional view illustrating the threaded fastener of FIGS. 2-5 fully embedded into a workpiece and with the projecting lugs thereof broken off;

FIG. 7 is a fragmentary elevational view of another type of torque release fastener in accordance with the invention;

FIG. 8 is a plan view of the fastener illustrated in FIG. 7;

FIG. 9 is a cross sectional view illustrating the orientation of a specialized driving tool operatively disposed between the upstanding lugs of the fastener illustrated in FIGS. 7 and 8;

FIG. 10 is a fragmentary plan view illustrating the fastener of FIGS. 7-9 fully embedded into a workpiece, and with the annular lug-mounting element broken from the fastener; and FIG. 11 is an enlarged sectional view taken along line 11—11 of FIG. 8 and further illustrating the details of construction of the fastener illustrated in FIGS. 7-10.

Referring now to the drawing, a threaded, torque release fastener 10 is illustrated in FIGS. 1-6. Fastener 10 includes an elongated, threaded shank 12 having an enlarged, integral, frustoconical head 14. Head 14 includes a central opening or recess 16 which is important for purposes to be described, along with a pair of opposed, upstanding lugs 18 which are secured to the generally planar uppermost face 20 of the head 14. As best seen in FIGS. 1-4, the lugs 18 are preferably located adjacent the periphery of face 20 and extend inwardly therefrom, and are spaced 180° apart on head 14. The lugs 18 are secured to face 20 along respective lines of weakness or frangibility 22. As will be more fully described hereinafter, the connection between the lugs 18 and head 14 is correlated with the desired predetermined torque level for the overall fastener 10.

A driving tool 24 is also illustrated in FIG. 1 and includes a handle 26, a shank 28 secured to the handle, and a radially enlarged driving head 30 at the end of shank 28 remote from handle 26. Head 30 is of generally circular cross section (see the dotted circular representation, FIG. 3), but includes a pair of circumferentially spaced, radially extending projections 32 which present respective outer cam surfaces adapted to engage the innermost upstanding edges of the respective lugs 18. In addition, the head 30 is configured to present a generally planar, radially outwardly extending face 34 adjacent the outermost end of each of the projections 32. The faces 34 are disposed to face in opposite directions relative to one another and are located 180° apart on head 30. Moreover, the faces 34 are configured to abut, in a face-to-face relationship, the lugs 18 during the driving of fastener 10. It will also be noted that the bottommost surface of head 30 is provided with a central, axially extending projection 35 which is adapted to be received within the opening 16 within fastener head 14.

In use when it is desired to install the fastener 10 into a workpiece 36, the following occurs. First, the user places head 30 of tool 24 between the lugs 18. This initial positioning is facilitated by provision of the cooperating projection 35 and opening 16. That is to say, the user first aligns the head 30 with the fastener head 14 and inserts projection 35 into opening 16. The user then grips the fastener 10 and rotates tool 24 in a clockwise direction until the cam-projections 32 on head 30 first begin to engage the inner edges of the respective lugs 18. This causes the lugs 18 to spread apart in a radial direction relative to the axis of fastener 10 to a limited degree, and thereby establishes a frictional connection between the head 30 and the fastener. This is advantageous in that the fastener is in effect coupled to the tool 24 for more convenient driving, especially in hard to reach places. In any event, the user then begins to thread fastener 10 into workpiece 36, and this action continues in the normal manner until the fastener is essentially completely embedded within the workpiece. At this point continued rotation of tool 24 causes the faces 34 of head 30 to come into full and complete engagement with the corresponding lugs 18 (see FIG. 4), and continued application of torque through tool 24 then causes the lugs 18 to be broken off completely from head 14. When this is accomplished, no further driving of fastener 10 is possible.

It will be readily understood that the lugs 18 are connected to fastener head 14 along respective lines of weakness which are correlated to the desired predetermined torque level for the fastener. That is to say, in the design of fastener 10 the lugs are secured in a manner such that they will break cleanly from head 14 when a predetermined torque level is reached.

Another fastener 38 in accordance with the invention is illustrated in FIGS. 8–11. Fastener 38 includes an elongated, threaded shank 40, an integral, frustoconical head 42, and a central opening 44 in the head. In this case however, an annular circumscribing mounting element or ring 46 is frangibly coupled to the periphery of head 42 along a single, continuous line of weakness or frangibility 48. A pair of opposed, circumferentially spaced lugs 50 are in turn secured to the annular element 46. A driving tool having a head 52 is provided for use in conjunction with fastener 38, with the head 52 being in all respects similar to head 30, save for the fact that it is of somewhat larger radial dimensions. Specifically, the head 52 includes a pair of outwardly extending projections 54 presenting cam surfaces, along with a pair of radially outwardly extending, opposed faces 56.

During driving operations with screw fastener 38, the same general procedure is followed as in the case of fastener 10 and tool 24. Specifically, the tool head 52 is first placed between the respective lugs 50 and rotated until the cam projections 54 come into engagement with the inner edges of the latter. The fastener 38 is then threaded into the workpiece 36 until the fastener is essentially completely embedded. At this point continued application of torque through the tool head 52 causes a break-off of the entire annular ring 46 along the annular line of frangibility 48. This condition is illustrated in FIG. 10. Just as in the case of fastener 10, when the element 46 (and of course lugs 50 connected thereto) break free of the fastener head, no further tightening of the fastener 38 is possible, and the user knows that the fastener is tightened to the predetermined, desired torque level.

Having thus described the invention, what is claimed as new and described to be secured by Letters Patent is:

1. The combination of a driving tool and a torque release screw fastener frictionally coupled to said tool in a relationship for screwing of the fastener into a workpiece, said combination comprising:

a driving tool, including--
  a handle;
  an elongated shank secured to the handle;
  a driving head located on said shank remote from handle and including--
    a substantially cylindrical main body portion which presents a screw-engaging lowermost face having a centrally located, axially extending, indexing projection extending therefrom; and
    a pair of circumferentially spaced cam projections located on said main body portion and extending outwardly therefrom, corresponding parts of said cam projections being spaced apart about 180° on said main body portion, said projections each presenting a smoothly arcuate outer surface extending tangentially from said main body portion, there being a lug-engaging surface extending outwardly from the outermost terminus of each arcuate, outer surface, the diameter of said main body portion combined with the widths of said pair of cam projections being greater than said diameter;

a torque release screw fastener frictionally coupled to said
  tool in a driving relationship, said fastener including--
  an elongated, threaded shank;
  a head secured to said shank and presenting--
    an upper face engageable with said screw-engaging face of said main body portion, said head including structure defining a central, axially extending opening through said upper face for rotatably receiving said indexing projection; and
    a pair of spaced, upstanding lugs frangibly secured to said upper face and located at the periphery of the upper face about 180° apart, each of said lugs presenting an inner, upstanding operating edge and a surface-engaging face, the shortest distance between said operating edges being slightly greater than said diameter of the main body portion but less than said diameter combined with the widths of said cam projections,
  said lugs being frangibly coupled to said head such that the lugs will transmit torque to said head up to a predetermined level, but will break free from the head when torque is applied thereto greater than said predetermined level, said main body portion and head being oriented such that--
  said main body portion is between said lugs with the lowermost face of the main body portion in engagement with the upper face of said head and said indexing projection is received in said head opening, the outer surfaces of said cam projections are respectively in frictional engagement with a corresponding adjacent lug operating edge for frictionally coupling said fastener to said tool, said lug-engaging surfaces are respectively located adjacent to a surface-engaging face of one of said lugs, and said main body portion is rotatable relative to said head when said fastener is fully screwed into said workpiece for causing engagement between said lug-engaging surfaces and the corresponding adjacent faces of said lugs in order that, when a torque in excess of said predetermined torque is applied to said lugs by said tool, said lugs break free of said head.

2. The combination as set forth in claim 1, wherein:

said head is of substantially frustoconical configuration and presents a circular, substantially planar upper face;

said screw-engaging face is substantially planar; and said lugs present respective, planar surface-engaging faces.

* * * * *